Aug. 9, 1927. 1,638,194
G. FROENDT
WATERING DEVICE
Filed April 3, 1926
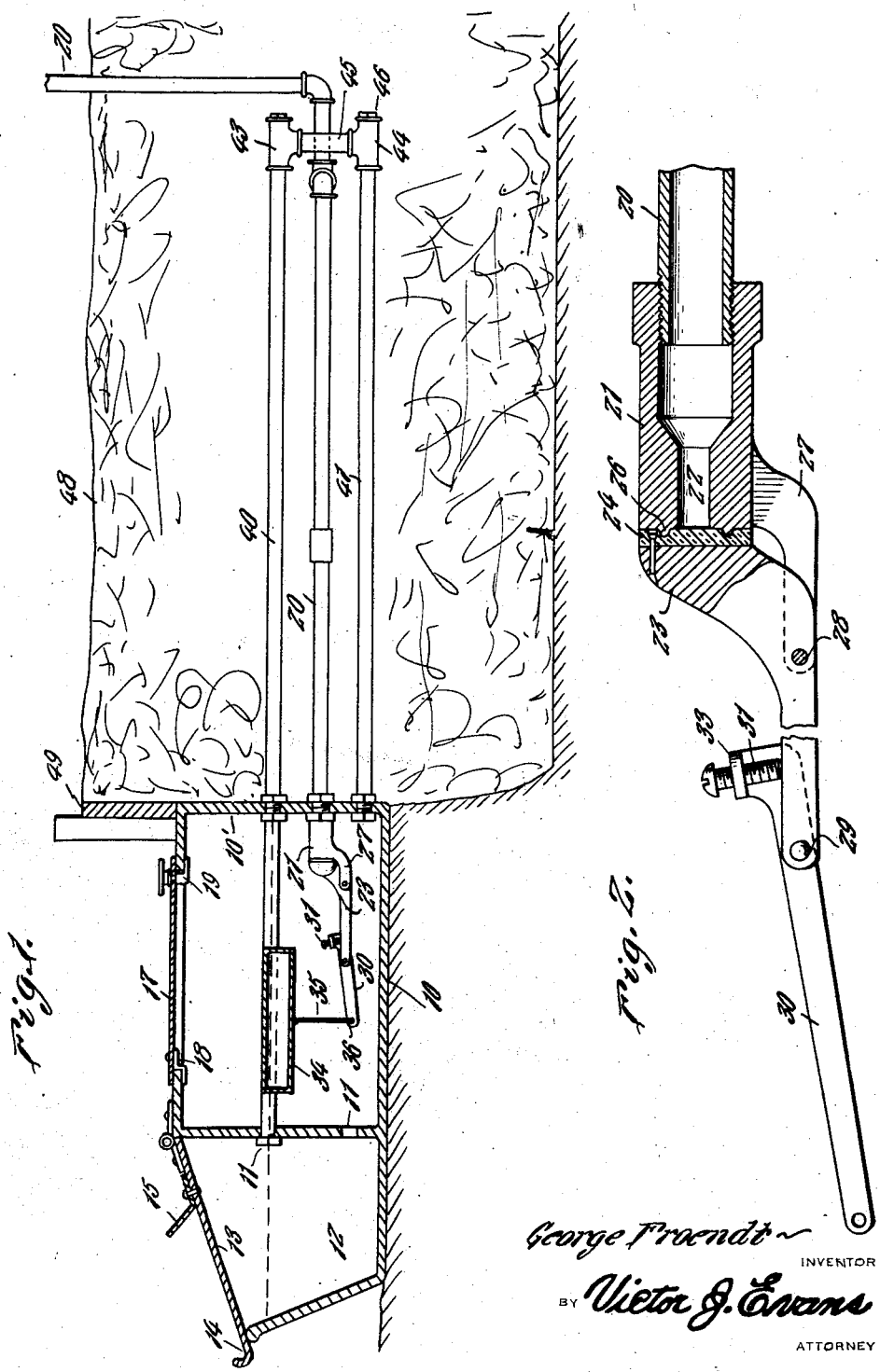
George Froendt
INVENTOR
BY Victor J. Evans
ATTORNEY Patented Aug. 9, 1927.

1,638,194

UNITED STATES PATENT OFFICE.

GEORGE FROENDT, OF MILFORD, IOWA.

WATERING DEVICE.

Application filed April 3, 1926. Serial No. 99,618.

The object of this invention is to provide means for supplying drinking water for hogs and other farm animals, and especially to provide for raising the temperature of the water over the temperature at the source of supply.

A further object is to provide a drinking fount in communication with a permanently covered float chamber to which the water is conducted, the flow being controlled automatically, and pipes extending from this chamber through a heat producing element, providing a continuous circulation, and keeping a supply of fresh water available under practically all conditions, regardless of the temperature of the air.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1 shows the device in vertical section and in elevation.

Figure 2 is a detail view, chiefly in section, showing the inlet connection, inlet valve, and the adjustable lever for the float of Figure 1.

A float chamber is designated 10, and has communication through opening such as 11, with a drinking fount 12, adapted to be closed by a hinged cover 13, the edge of which projects at 14, permitting the cover to be raised by the animals. A guard member 15 is designed to keep dirt out of the fount, and this portion of the construction, that is the fount, may be formed with the float chamber 10, if it is desired to cast the walls of the chamber in one piece.

The float chamber is provided with an upper opening, closed by a cover 17 secured by engaging devices 18, and by a rotatable engaging device or devices 19, permitting of the detachment of the cover plate 17 for cleaning purposes.

A water inlet pipe is designated 20, and carries a valve casing 21 on its inner end where the latter projects through the wall 10′ of casing 10. The bore 22 of valve casing 21 is closed by a valve member 23 carrying a gasket 24, this element last named being provided with a groove cooperating with the annular ring 26 on the element 21, in order to provide a fluid-tight fit at the point shown.

The valve 23 is pivotally mounted between arms such as 27 formed on valve casing 21, the pivotal point being designated 28, and said element 23 has pivoted thereto at 29 a float lever designated 30, adjustable connection being effected by means of screw 31 threaded through offset portions 33 on float lever 30.

The float 34 is illustrated as comprising a hollow body having connection by rod or stem 35 with lever 30, at the point 36. In view of this construction, it will be observed that the inflow may be controlled by the float 34 and the adjusting means designated 31.

In order to provide a continuous circulation, through the fount 12 and float chamber 10, I connect therewith upper and lower pipes 40 and 41 which project through wall 10′, and which are in communication with each other through the connection shown at the right of Figure 1.

T-shaped connections 43 and 44 are connected with pipes 40 and 41, and are connected with each other by a short pipe 45, plugs such as 46 closing the ends of the T elements, at the points shown. The pipes 20, 40 and 41 pass through a heating medium designated 48, adapted to be confined within pit or enclosure 49, and the water passing through the pipes, in contact with this heat medium, is warmed sufficiently to prevent freezing, so that a supply of fresh water, at proper temperature, is available at all times, in the drinking fount 12.

It is the intention that live manure, or other similar heat producing or heat insulating material shall be employed for covering the pipes in inclosure or pit 49.

Having thus described the invention, what I claim as new is:

In a device of the class described, a float chamber, a drinking fount in communication therewith, a water inlet pipe extending into the float chamber, a valve casing connected with the end of the pipe, a valve movable angularly and outwardly beyond the end of the casing to permit the discharge of water from said pipe, a float controlling the valve, circulation pipes connected respectively with upper and lower portions of the fount and float chamber and having communication with each other, and means for raising the temperature of the water in said pipes by chemical action.

In testimony whereof I affix my signature.

GEORGE FROENDT.